(12) United States Patent
McCall et al.

(10) Patent No.: US 7,694,060 B2
(45) Date of Patent: Apr. 6, 2010

(54) SYSTEMS WITH VARIABLE LINK WIDTHS BASED ON ESTIMATED ACTIVITY LEVELS

(75) Inventors: James A. McCall, Beaverton, OR (US); Bruce A. Christenson, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 1278 days.

(21) Appl. No.: 11/155,857

(22) Filed: Jun. 17, 2005

(65) Prior Publication Data

US 2006/0285847 A1    Dec. 21, 2006

(51) Int. Cl.
G06F 1/00    (2006.01)

(52) U.S. Cl. .............. 710/307; 710/305; 710/105; 710/106

(58) Field of Classification Search .......... 710/36–38, 710/306–307; 711/167, 171
See application file for complete search history.

(56) References Cited

U.S. PATENT DOCUMENTS

| | | | |
|---|---|---|---|
| 5,396,635 A | 3/1995 | Fung | 395/800 |
| 5,781,784 A | 7/1998 | McKinley | 395/750.03 |
| 5,911,053 A * | 6/1999 | Pawlowski et al. | 710/307 |
| 6,009,488 A | 12/1999 | Kavipurapu | |
| 6,484,223 B1 | 11/2002 | Lenz | |
| 6,526,469 B1 | 2/2003 | Drehmel et al. | |
| 6,665,742 B2 | 12/2003 | Owen et al. | |
| 6,681,285 B1 * | 1/2004 | Ng | 710/309 |
| 7,111,108 B2 * | 9/2006 | Grundy et al. | 711/100 |
| 7,136,953 B1 * | 11/2006 | Bisson et al. | 710/307 |
| 7,418,005 B2 | 8/2008 | Arima | |
| 2002/0103945 A1 | 8/2002 | Owen et al. | |
| 2003/0088799 A1 | 5/2003 | Bodas | |
| 2004/0128576 A1 | 7/2004 | Gutman et al. | 713/323 |
| 2006/0015761 A1 | 1/2006 | Kwa et al. | 713/320 |
| 2006/0034295 A1 | 2/2006 | Cherukuri et al. | |

FOREIGN PATENT DOCUMENTS

| | | |
|---|---|---|
| EP | 1599006 A1 | 11/2005 |
| JP | 04-359335 | 11/1992 |
| JP | 08-223390 | 2/1995 |
| JP | 2000-261435 | 3/1999 |
| JP | 2001-022690 | 7/1999 |
| JP | 2002-259327 | 9/2002 |
| JP | 2003-037613 | 7/2003 |

OTHER PUBLICATIONS

Intel Corp, Inc, "PCT/US2006/024193", *International Search Report and Written Opinion for Case P21365PCT Mailed Feb. 1, 2007*, 11 Pages.

(Continued)

*Primary Examiner*—Raymond N Phan
(74) *Attorney, Agent, or Firm*—Trop, Pruner & Hu, P.C.

(57) ABSTRACT

In some embodiments, a chip includes transmitters and receivers, and control circuitry. The control circuitry to cause some of the transmitters and receivers to be inoperative in response to an estimated activity level being in a first range, while others of the transmitters and receivers remain operative. Other embodiments are described and/or claimed.

29 Claims, 7 Drawing Sheets

OTHER PUBLICATIONS

U.S. Appl. No. 10/850,733, filed May 21, 2004.
U.S. Appl. No. 10/850,809, filed May 21, 2004.
U.S. Appl. No. 10/850,851, filed May 21, 2004.
U.S. Appl. No. 10/851,925, filed May 21, 2004.
U.S. Appl. No. 10/891,348, filed Jul. 13, 2004.
PCI Express Base Specification, Revision 1.0, Jul. 22, 2002, pp. 1-8 and 165-189.
German Patent and Trademark Office, Office Action dated Oct. 29, 2008 in related application.
Chinese Patent And Trademark Office, First Office Action dated Nov. 28, 2008 in related foreign patent application.
European Patent Office, Summons to attend oral proceedings pursuant to Rule 115(1) EPC, dated Nov. 28, 2008, pp. 1-5 in EP patent application No. 04255079.8.
European Office Action dated Mar. 19, 2007, from European Patent Application No. 04255079.8-1237, pp. 1-4.
The Patent Office of the State Intellectual Property Office of the People's Republic of China, First Office Action (PCT Application in the National Phase), dated Apr. 3, 2009, in a related application.
Japanese Patent and Trademark Office, Notification of Reasons for Rejection dated Feb. 3, 2009, in Japanese patent application No. 2004-235926.
Office Action of the Intellectual Property Office of Taiwan dated Feb. 27, 2009 in a related application.
Korean Patent Office, Notice of Preliminary Rejection dated Aug. 19, 2009, in a related application.

* cited by examiner

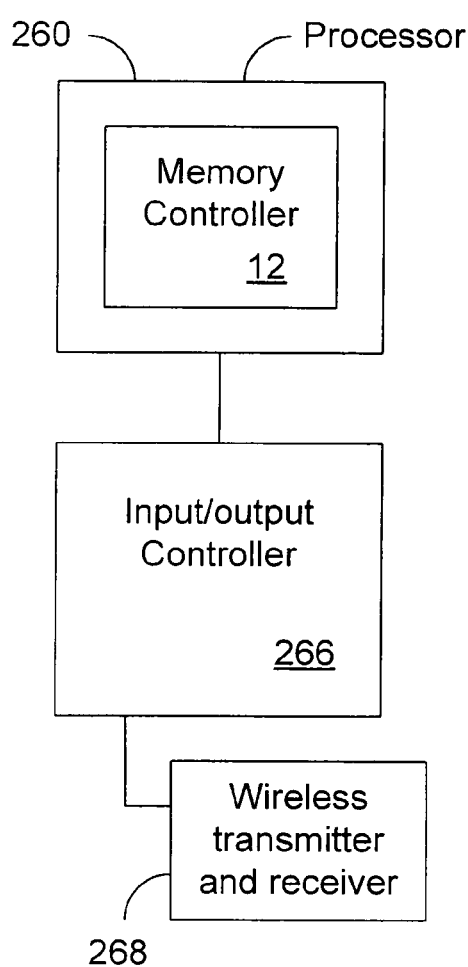
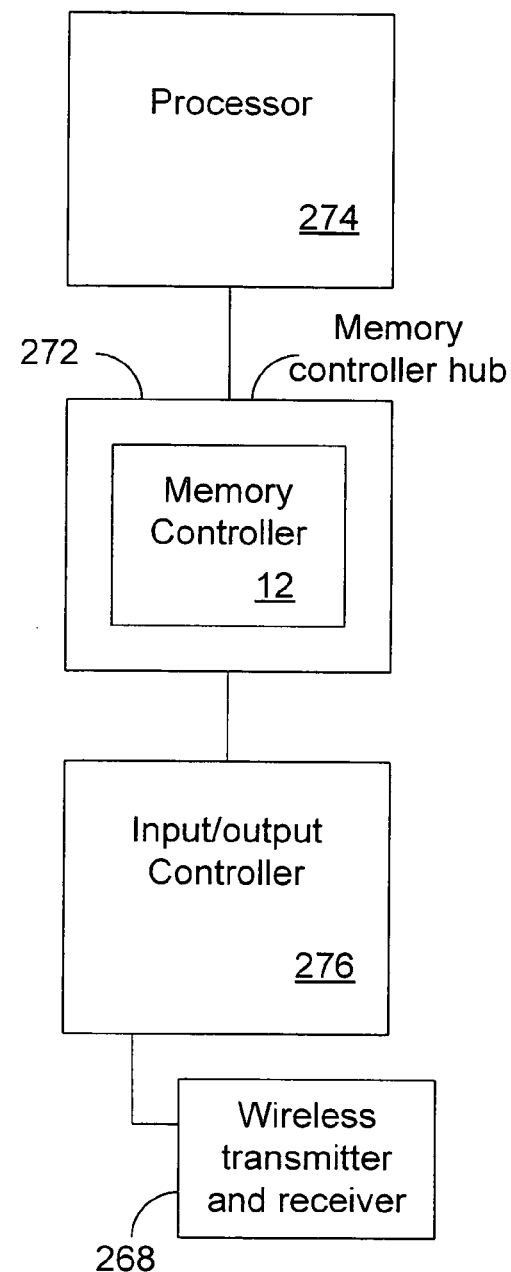
FIG. 15
FIG. 16

SYSTEMS WITH VARIABLE LINK WIDTHS BASED ON ESTIMATED ACTIVITY LEVELS

BACKGROUND

1. Technical Field

The present inventions relate to systems with variable link widths.

2. Background Art

Various arrangements for memory chips in a memory system have been proposed. For example, in a traditional synchronous dynamic random access memory (DRAM) system, a memory controller and memory chips communicate data through bidirectional data buses and receive commands and addresses through command and addresses buses. The memory chips have stubs that connect to the buses. In some memory systems, the undirectional or bidirectional are point to point interconnects.

In some memory systems, a memory chip receives signals and repeats them to a next memory chip in a series of two or more memory chips. In some of these systems, the last memory chip in the series can send a signal directly back to a memory controller or other originating chip. This is referred to as a ring.

Links between a memory controller and memory chips may be single ended (one conductor) or differential (two conductors carrying complementary signals).

There are various types of transmitters and receivers. Some include delay locked loops to provide clock or strobe signals. Some involve phase interpolators.

Various low power states have been used to reduce power consumption of circuits. These involve reducing voltages or frequency to some or all circuits in a chip or completely shutting off power to portions or all of a chip.

Memory modules include a substrate on which a number of memory chips are placed. The memory chips may be placed on only one side of the substrate or on both sides of the substrate. In some systems, a buffer is also placed on the substrate. For at least some signals, the buffer interfaces between the memory controller and the memory chips on the module. In such a buffered system, there is different signaling (for example, frequency and voltage values, and point-to-point versus a multi-drop arrangement) between the memory controller and the buffer than between the buffer and the memory chips.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described or illustrated, but are for explanation and understanding only.

FIGS. 15 and 16 are each a block diagram representation of a system including a memory controller according to some embodiments of the inventions.

DETAILED DESCRIPTION

Figure 1:
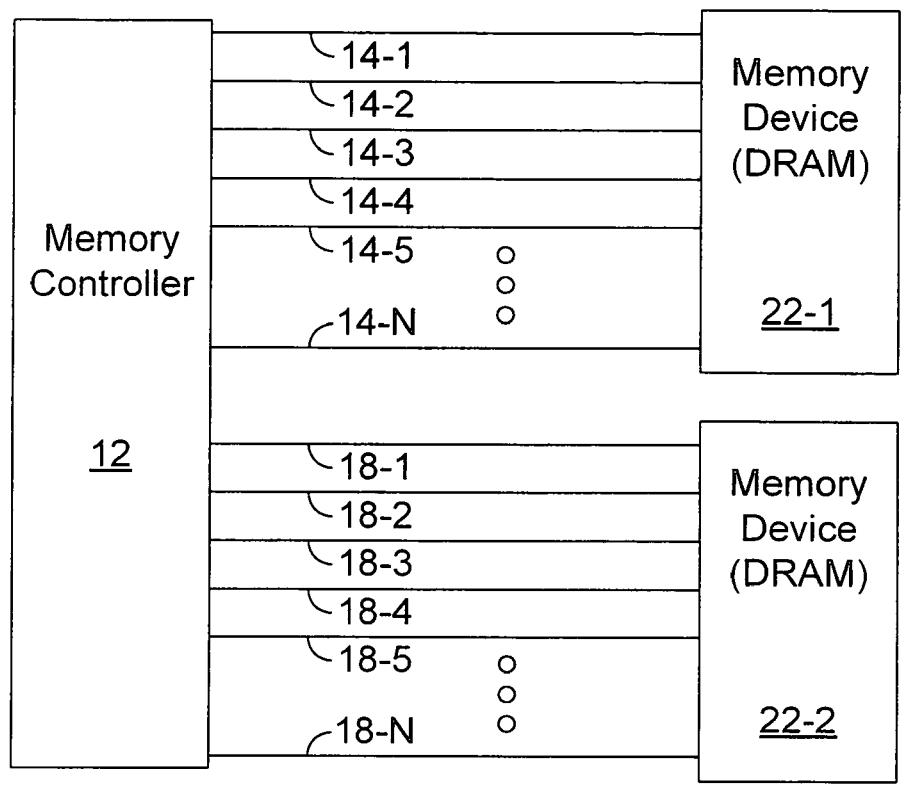
FIGS. 1 and 2 are each a block diagram representation of a system including a memory controller and first and second memory devices according to some embodiments of the inventions.

Referring to FIG. 1, a memory system 10 includes a memory controller 12 coupled through lanes 14-1, 14-2, . . . 14-N to a memory device 22-1 and through lanes 18-1, 18-2, . . . 18-N to a memory device 22-2. Lanes 14-1 . . . 14-N and 18-1 . . . 18-N may be single ended or differential. The memory devices may be a dynamic random access memory (DRAM) chip or some other sort of memory chip. In an actual implementation, it is expected that there will be more than two memory devices in the system. Lanes 14-1 . . . 14-N may be part of the same link as lanes 18-1 . . . 18-N or they may be part of a different link. Lanes 14-1 . . . 14-N may be part of the same channel as lanes 18-1 . . . 18-N or they may be part of different channel.

Memory controller 12 can dynamically change the number of operable lanes in at least one link depending on estimated activity level on the link. This can improve the tradeoff between a higher bandwidth when needed and reduced power consumption when a higher bandwidth is not needed. Memory controller 12 can operate in different power states or modes. In a fully operative state, all the lanes are operative. In a partially operative state, some of the lanes are inoperative through making associated transmitters and receivers inoperative. The partially operative state can be considered a low power state. However, in some embodiments, memory controller 12 can also have one or more additional low power states in which, for example, all the lanes are inoperative. In addition, in some embodiments, memory controller 12 can also simultaneously or sequentially operate in other states such as power throttling states.

In FIG. 1, the transmitters and receivers for lanes 14-1 . . . 14-N and 18-1 . . . 18-N are operative, meaning they are actually transmitting or receiving signals or are immediately ready to transmit or receive signals. Accordingly, it is said that lanes 14-1 . . . 14-N and 18-1 . . . 18-N are operative, because they are actually carrying signals or are ready to carry signals. Accordingly, the system, transmitters, receivers and groups of lanes are fully operational.

Figure 2:
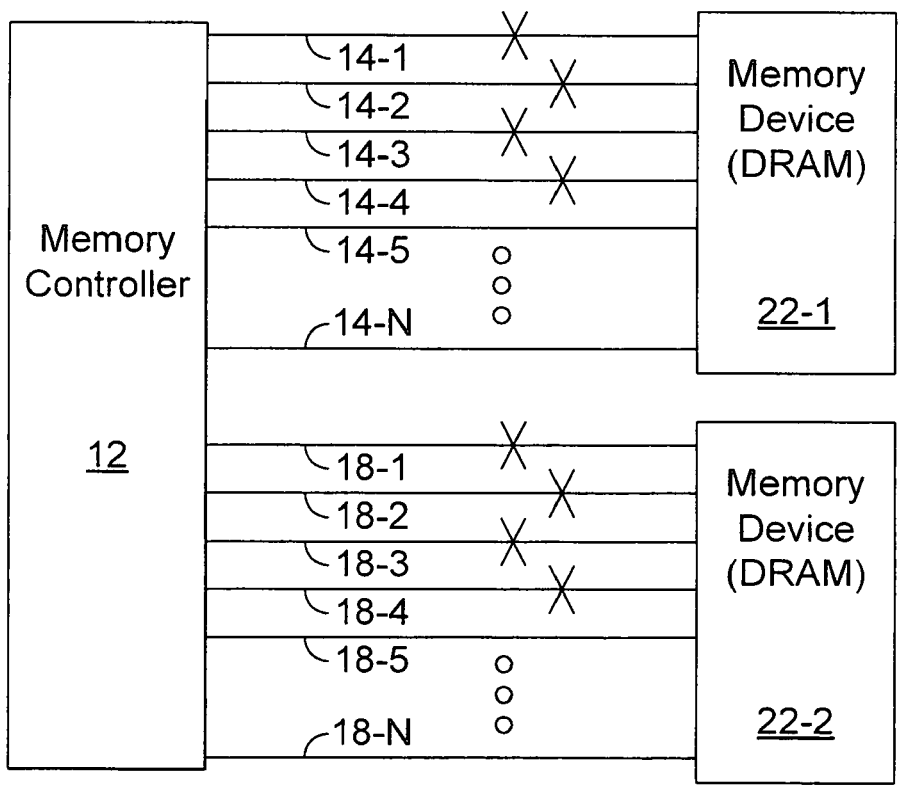

By contrast, in FIG. 2, the transmitters and receivers for lanes 14-5 . . . 14-N are operative and 18-1 . . . 18-N are operative, but the transmitters and receivers for lanes 14-1 . . . 14-4 and 18-1 . . . 18-4 are not operative. In FIG. 2, an "X" indicates an inoperative lane. The transmitters and receivers that are not operative consume much less power than those that are operative but not actually being used to transmit or receive signals. In FIG. 2, there are only four lanes turned inoperative, but it could be a different number.

In FIG. 1, lanes 14-1 . . . 14-4 are shown as being next to each other and lanes 14-5 . . . 14-N are shown as being next to each other. However, in an actual implementation, the particular lanes that are turned off do not have to be physically next to each other. In some embodiments, different lanes carry different types of signals. For example, read data may be carried on different lanes than commands. Some of the lanes that are inoperative may be those that carry one type of signal (for example, commands) and others of the inoperative lanes may be those that carry another type of signal (for example, read data). Still others of the lanes may be those that carry still other types of signals.

In some embodiments, the burst length changes as the number of lanes is reduced. For example, assume that in ordinary operation, there are eight operative lanes and a burst length of 8 to provide a cache line of 64 bytes. If the number of operative lanes is reduced to four, the burst length may be increased to 16 to achieve the 64 bytes. Alternatively, there may be two commands rather than one.

In other embodiments, the number of lanes 14 which are operational is the same as the number of lanes 18 which are operational. In other embodiments, the number of lanes 14 which are operational may be different than the number of lanes 18 which are operational.

Figure 3:
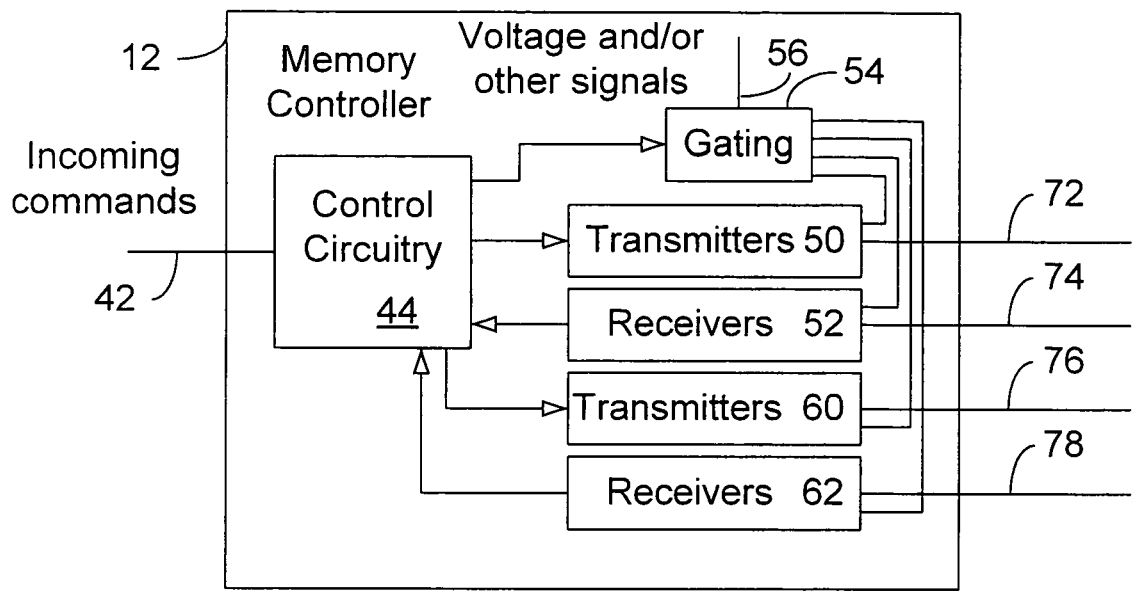
FIG. 3 is a block diagram representation of the memory controller of FIGS. 1 and 2 according to some embodiments of the inventions.

There are various ways in which memory controller 12 can be implemented. FIG. 3 illustrates a block diagram arrangement of a portion of memory controller 12 according to some of the embodiments, but memory controller 12 may be different in various other embodiments.

Referring to FIG. 3, commands are received by control circuitry 44 through conductors 42. As an example, the commands may be received directly or indirectly from a processor or other circuitry in a computer system. Data signals are carried on conductors 42 or other conductors. Control circuitry 44 provides commands to transmitters 50 and transmitters 60. While they are operational, transmitters 50 provides signals to lanes 72 and receivers 52 receives signals from lanes 74. While they are operational, transmitters 60 provides signals to lanes 76 and receivers 62 receives signals from lanes 78. Control circuitry 44 receives signals from receivers 52 and 62.

Figure 4:
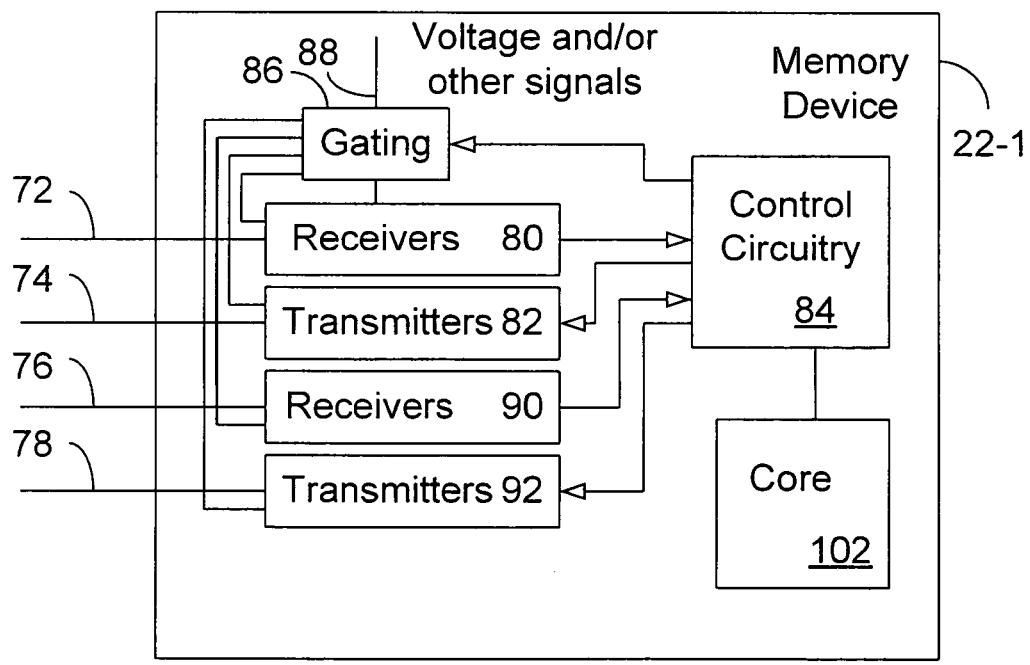
FIG. 4 is a block diagram representation of a memory device of FIGS. 1 and 2 according to some embodiments of the inventions.

Lanes 72, lanes 74, lanes 76, and lanes 78 each include more than one lane so that transmitters 50 includes more than one transmitter. Likewise, receivers 52 includes more than one receiver. The number of transmitters does not have to equal the number of receivers. Lanes 72 and 74 may include lanes 14-1 . . . 14-4, and lanes 76 and 78 may include lanes 14-5 . . . 14-N. In FIGS. 1 and 2, lanes 14-1 . . . 14-N may be unidirectional, sequential bi-directional, or simultaneous bidirectional. In the examples of FIGS. 3 and 4, lanes 72, lanes 74, lanes 76, and lanes 78 are unidirectional.

Control circuitry 44 controls whether gating circuitry 54 allows transmitters 50 and receivers 52 to receive the voltage and/or other signals from conductors 56. As an example, gating circuitry 54 could include AND gates. When system 10 is in the fully operational state, gating circuitry 54 allows a voltage signal(s) and/or other signals from conductors 56 to transmitters 50 and 60 and receivers 52 and 62. For example, the voltage signal may be the supply voltage Vcc and/or another voltage(s). The other signals may include clock or strobe signals from a delay locked loop(s). When system 10 is in the partially operational state, gating circuitry 54 prevents transmitters 50 and receivers 52 from receiving the voltage signal(s) and/or other signals from conductors 56, but allows transmitters 60 and receivers 62 to receive the signals. Note there may be various buffer or other circuits coupled between gating circuitry 54 and transmitters 50 and receivers 52 that likewise will not receive the signals when transmitters 50 and receivers 52 do not.

In an even lower power state, gating circuitry 54 can prevent transmitters 50 and 60 and receivers 52 and 62 from receiving the signals from conductors 56. In some embodiments, transmitters 60 and receivers 62 do not receive signals from gating circuitry 54.

Control circuitry 44 (or other circuitry) determines whether an estimated activity level is a first range or a second range, or in some embodiments a third range or even a fourth range. The fourth range may be the same as or different than the first range.

As an example, in the case of the first range, the estimated activity level is less than a threshold, and in the case of the second range, the estimated activity level is equal to the greater than threshold. Other examples of the first and second ranges could be met. There may be different types of estimated activity levels involving estimations of different lanes or transmitters and receivers. For example, one estimated activity level could concern activity on one link, part of a link, or channel, and another activity level could concern activity on another link, another part of the link, or another channel. Merely as examples and not as requirements, an estimated activity level may involve an estimated number of signals in an amount of time expected to pass through the transmitters and receivers if they are not made inoperative, and a second estimated activity level may involve an estimated number of signals in the amount of time expected to pass through certain ones of the transmitters and receivers if they are not made inoperative. The various estimated activity levels may mean still other things depending on the embodiment.

There are various ways in which memory device 22-1 and 22-2 may be implemented. FIG. 4 illustrates a block diagram arrangement of memory device 22-1 according to some of the embodiments, but memory device 22-1 may be different in various other embodiments. Referring to FIG. 4, receivers 80 and 90 receive signals from lanes 72 and 76 and transmitters 82 and 92 transmit signals to lanes 74 and 78. Control circuitry 84 controls whether gating circuitry 86 allows receivers 80 and 90, and transmitters 82 and 92 to receive voltage and/or other signals from conductors 88. When system 10 is in the fully operational state, gating circuitry 86 allows the voltage signal(s) and/or other signals from conductors 88 to receivers 80 and transmitters 82. The voltage signal(s) and/or other signals may be the same as or different than in memory controller 12. When system 10 is in the partially operational state, gating circuitry 86 prevents receivers 80 and transmitters 82 from receiving the voltage signal(s) and/or other signals from conductors 88. Note there may be various buffer or other circuits coupled between gating circuitry 86 and receivers 80 and transmitters 82 that likewise will not receive the signals when receivers 80 and transmitters 82 do not.

In an even lower power state, gating circuitry 86 can prevent receivers 80 and 90 and transmitters 82 and 92 from receiving the signals from conductors 88. In some embodiments, receivers 90 and transmitters 92 do not receive signals from gating circuitry 86.

Figure 5:
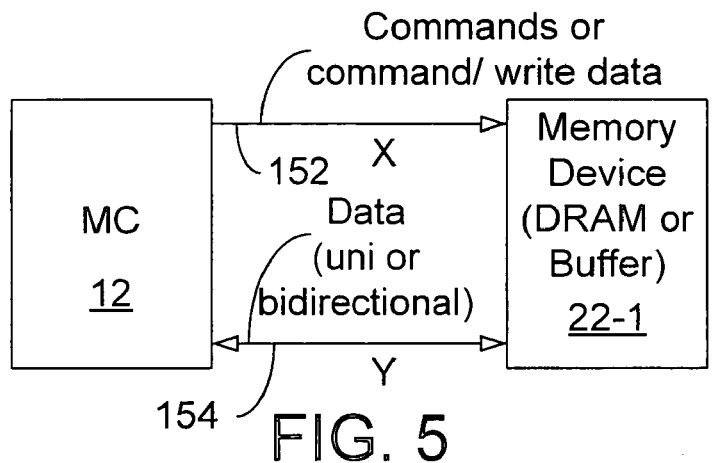
FIGS. 5-8 are each a block diagram representation of a system including a memory controller and a memory device according to some embodiments of the inventions.

FIG. 5 illustrates memory controller 12 coupled to memory device 22-1 through a group of lanes 154 (having X lanes) and a group of lanes 154 (having Y lanes). In this example, lanes 154 unidirectionally carry commands, or commands and write data to memory device 22-1 (which may be a DRAM or other type of memory or a buffer). Depending on the embodiment, address information could be on lanes 152 or 154 or other lanes (not shown). Lanes 154 carry data and may be unidirectional or bidirectional. In FIG. 5, lanes 152 and 154 are all operational. Lanes 152 and lanes 154 may be considered to be part of the same link or different links.

Figure 6:
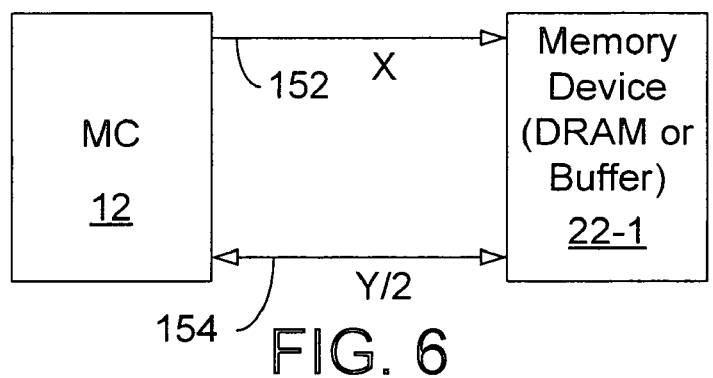

FIG. 6 is like FIG. 5 except that only Y/2 of lanes 154 are operational. All of lanes 152 are operational as in FIG. 6.

Figure 7:
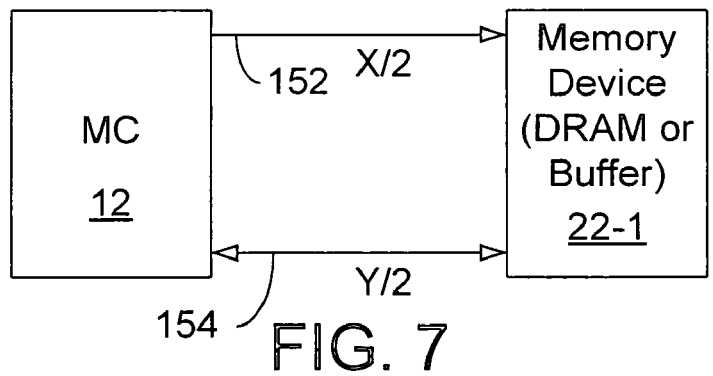

FIG. 7 is like FIG. 5 except that only X/2 of lanes 152 are operation and only Y/2 of lanes 154 are operational.

Figure 8:
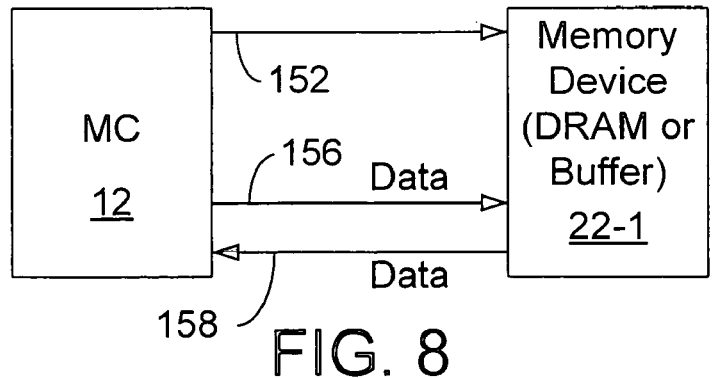

FIG. 8 illustrates two unidirectional groups of lanes 156 and 158 in place of lanes 154.

Figure 9:
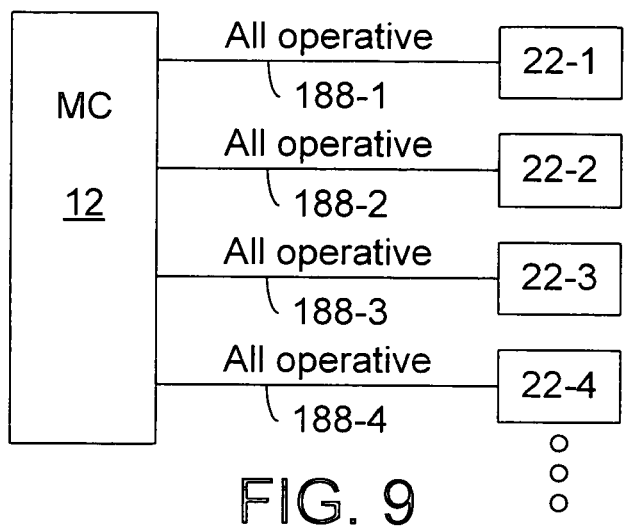
FIGS. 9-11 are a block diagram representation of a system including a memory controller and memory devices according to some embodiments of the inventions.

FIG. 9 illustrates memory controller 12 coupled to memory devices 22-1, 22-2, 22-3, and 22-3 through lanes 188-1, 188-2, 188-3, and 188-4 (which may each include one or more links). There may be more memory devices in the system. In FIG. 9, each of the lanes is operative.

Figure 10:
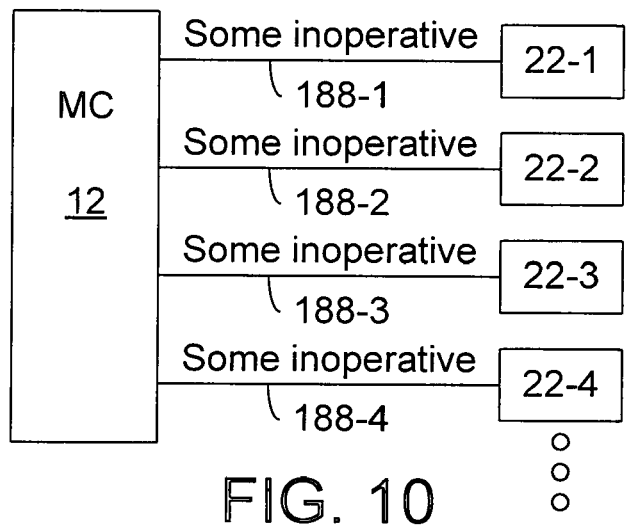
Figure 11:
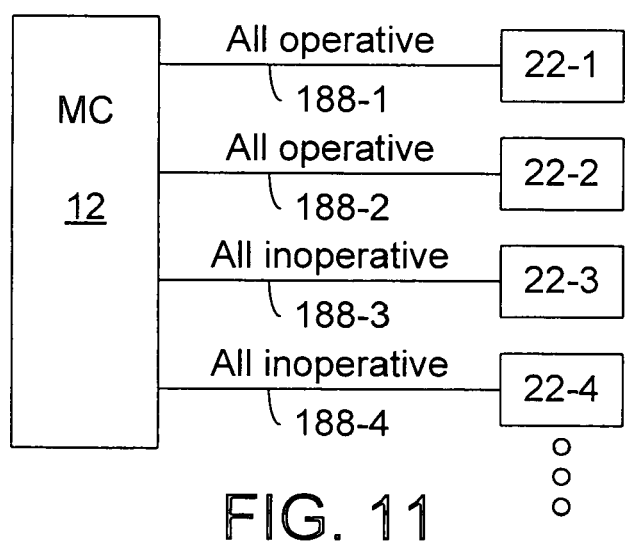

As illustrated in FIGS. 10 and 11, the particular lanes that are inoperative can be distributed differently among lanes coupled to different memory devices. In FIG. 10, some of lanes 188-1, some of lanes 188-2, some of lanes 188-3, and some of lanes 188-4 are inoperative. In FIG. 11, all of lanes 188-1 and 188-2 are operative and all of lanes 188-3 and 188-4 are inoperative. The total number of inoperative lines in FIGS. 10 and 11 may be the same or they could be different.

Figure 12:
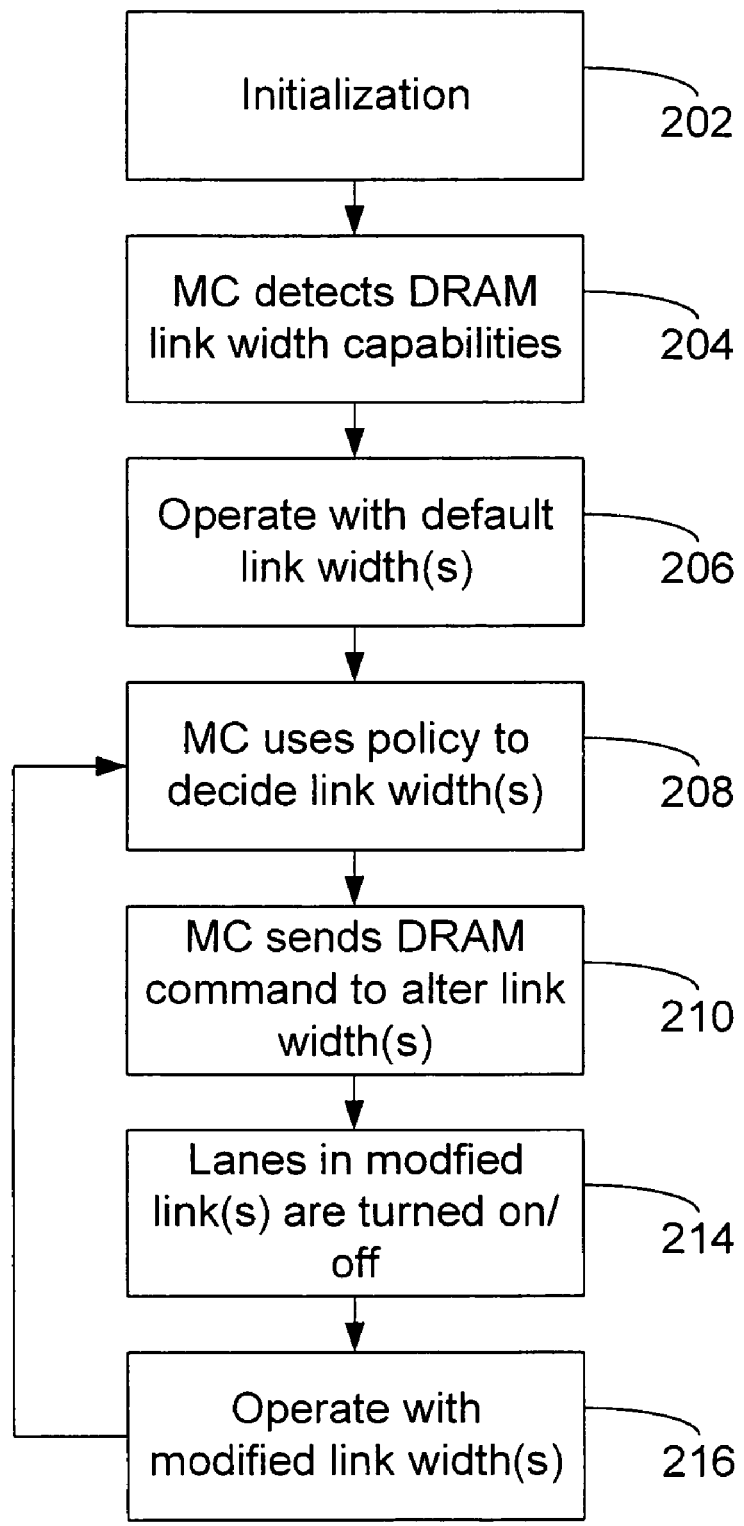
FIG. 12 is a flow diagram of the operation of the system of FIGS. 1 and 2 according to some embodiments of the inventions.

FIG. 12 illustrates a flow diagram of operations of some embodiments, but other operations could be used in other embodiments. Referring to FIG. 3, memory controller 12 is initialized (block 202). Memory controller 12 detects memory device line width capabilities (block 204). The memory system operates with a default link width(s). The word "width(s)" is used because there may be more than one group of lanes involved (as in FIG. 6).

Control circuitry 44 of FIG. 3 monitors the incoming commands on conductors 42 and determines whether to switch a particular group lane or groups of lanes from be fully operational to partially operation, or from being partially operational to be fully operational (block 208). In some embodiments, control circuitry 44 may also have a choice between different levels of partial operation (for example, a choice of X/2, X/4, or 3X/4 lanes being inoperative). Control circuitry 44 includes circuitry to determine whether certain policies are met in deciding whether to change the link width.

When control circuitry 44 determines that the number of operational lanes should be changed, it sends a command to control circuitry 90 of memory device 22-1 as described above (block 210). Control circuitry 90 then causes receivers 80 and transmitters 82 to be inoperative through gating circuitry 84 as described above. Likewise, control circuitry 44 causes transmitters 50 and receivers 52 to be inoperative through gating circuitry 54 as described above. In some embodiments, receivers 80 and transmitters 82 becomes inoperative before transmitters 50 and receivers 52 becomes inoperative and in other embodiments, the opposite is the case.

The lanes in the particular link(s) are turn on or off (made operational or inoperative) (block 214) as described above. The system then operates with the new link width(s) (block 216). In some embodiments, control circuitry 44 continues to monitor the incoming commands to determine whether to change the link widths. Since the amount and type of incoming commands in a given time period can change rapidly, the link widths can also change rapidly. If the link widths change too often, there might be extra power lost making the links operable. In some embodiments, in order to prevent changing the link widths too often, the control circuitry only changes the link width when there is a significant change in the estimated activity level (projected bandwidth needs).

Figure 13:
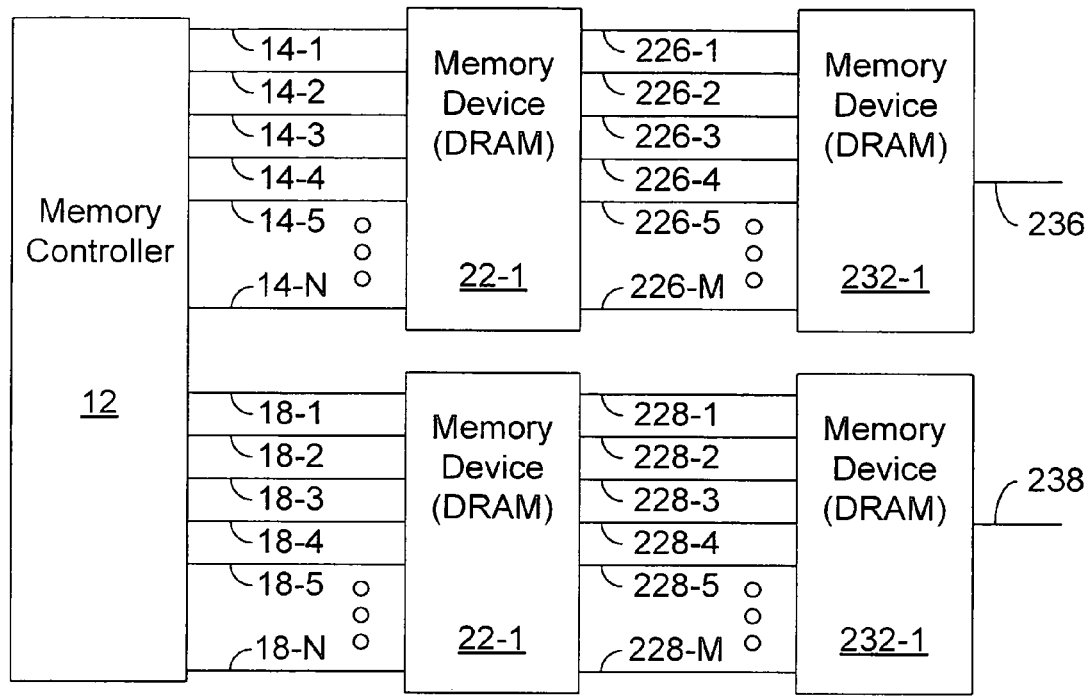
FIG. 13 is a block diagram representation of a system including a memory controller and memory devices according to some embodiments of the inventions.

FIG. 13 illustrates a system in which memory devices act as repeaters to other memory devices. For example, memory device 232-1 is coupled to memory device 22-1 through lanes 226-1 . . . 226-M and memory device 232-2 is coupled to memory device 22-2 through lanes 228-1 . . . 228-M. (M may equal N or not equal N.) There are various ways of coupling repeater memory devices 22-1 and 232-1. In some embodiments, the repeater system includes lanes 236 and lanes 238 to provide a loop for read data to return to memory controller 12, although lanes 236 and 238 are not required for all embodiments. In different embodiments, control circuitry can control the width of one or more (for example, all) of these groups of lanes or links.

Figure 14:
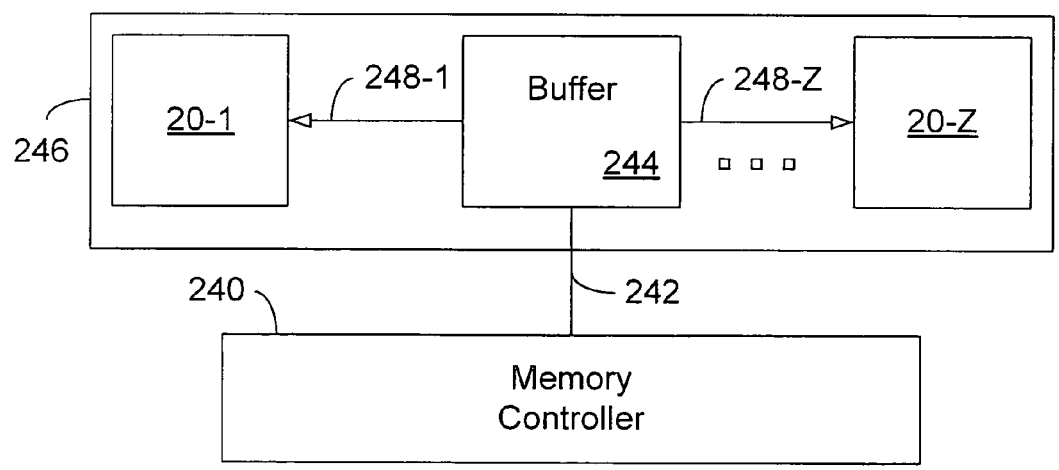
FIG. 14 is a block diagram representation of a system including a memory controller and a module with memory devices according to some embodiments of the inventions.

FIG. 14 illustrates a system in which memory controller 240 is coupled to memory devices 20-1 . . . 20-Z on a substrate 246 through a buffer 244. The width of a group of lanes 242 may be changed. In some embodiments, the width of a group of lanes 248-1 . . . 248-Z may also be changed. The control circuitry to determine whether the width of lanes 248-1 . . . 248-Z should be changed may be in memory controller 242 or in buffer 244. There may be other buffers linked to buffer 244 and the widths of joining lanes may also be changed. There may be additional modules with buffers in the system.

FIG. 15 illustrates memory controller 12 in a processor chip 260, which is coupled to an input/output controller 266. Input/output controller 266 is in turn coupled to an optional wireless transmitter and receiver 268.

FIG. 16 illustrates memory controller 12 in a memory controller hub 272, which is coupled to processor chip 274. Memory controller hub 272 is coupled to an input/output controller 276. Input/output controller 276 is in turn coupled to an optional wireless transmitter and receiver 268.

ADDITIONAL INFORMATION AND EMBODIMENTS

Although the illustrated embodiments have been described in terms of memory systems, the inventions could be implemented in chips that are not memory devices or in chips that include a memory controller, but in parts of the chips other than the memory controller. For example, the inventions could be implemented in interfaces that are not primarily to carry memory commands or associated data.

The inventions are not restricted to any particular signaling techniques or protocols. For example, the signaling may be single ended or differential. The signaling may include only two voltage levels or more than two voltage levels. The clock (or strobe) may be transmitted separately from the signals or embedded in the signals. Various coding techniques may be used. Serial or traditional parallel signaling may be used. The signals may be packetized, multiplexed, or have dedicated lines. For example, command, address, write data signals may be packetized or time multiplexed. Or there could be dedicated lines for commands, dedicated lines for commands, and dedicated lines for write data or some combination of these. The inventions are not restricted to a particular type of transmitters and receivers. Various clocking techniques could be used in the transmitters and receivers and other circuits. The receiver symbols in the figures may include both the initial receiving circuits and the-related latching and clocking circuits. The circuitry may be voltage mode, current mode, or otherwise. Transmitters and receivers may include delay locked loops (DLLs) or phase locked loops (PLLs), but these are not required. The other signals on conductors 88 may include phase interpolator signals, but this is not required.

Memory controller 12 has been described in a variety of embodiments. No single memory controller need to all of the functions attributed to memory controller 12 as described in connection with the figures.

Control circuitry 44 and 84 may perform additional functions not described in this disclosure or there may be additional control circuitry not shown.

There may be a variety of circuits in the chips which are not illustrated in the figures. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element. If the specification or claims refer to "an additional" element, that does not preclude there being more than one of the additional element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
   transmitters and receivers;
   control circuitry to cause some of the transmitters and receivers to be inoperative in response to an estimated activity level being in a first range, while others of the transmitters and receivers to remain operative; and
   gating circuitry coupled to a conductor to carry a voltage signal and wherein the control circuitry is to control whether at least a portion of the transmitters and receivers receive the voltage signal through the gating circuitry, and wherein at least some of the transmitters and receivers that do not receive the voltage signal are to be inoperative.

2. The chip of claim 1, wherein in response to the estimated activity level being in a second range, the control circuitry does not cause any of the transmitters and receivers to be inoperative, and wherein the estimated activity level being in the first range means that the estimated activity level is less than a first threshold, and the estimated activity level being in the second range means that the estimated activity level is equal to or greater than the first threshold.

3. The chip of claim 1, wherein if the estimated activity level is in a third range, the control circuitry causes some additional ones of the transmitters and receivers to be inoperative.

4. The chip of claim 1, wherein the chip further comprises a memory controller that includes the control circuitry and wherein different groups of the transmitters and receivers are to be coupled to different memory devices through lanes and in some situations, the control circuitry makes all of some groups of transmitters and receivers inoperative while all of other groups of transmitters and receivers are operative.

5. The chip of claim 1, wherein the chip further comprises a memory controller that includes the control circuitry and wherein different groups of the transmitters and receivers are to be coupled to different memory devices through lanes and in some situations, the control circuitry makes some of the transmitters and receivers of each of the groups inoperative.

6. The chip of claim 1, wherein if a second estimated activity level is in a fourth range, the control circuitry causes some different ones of the transmitters to be inoperative while others of the transmitters and all the receivers remain operative.

7. The chip of claim 1, wherein the gating circuitry is coupled to additional conductors carrying the voltage signal and other signals and wherein the control circuitry controls whether the at least a portion of the transmitters and the receivers receive the other signals.

8. The chip of claim 1, wherein the estimated activity level involves an estimated number of signals in an amount of time expected to pass through the transmitters and receivers if some are not made inoperative, and wherein a second estimated activity level involves an estimated number of signals in the amount of time expected to pass through certain ones of the transmitters and receivers if they are not made inoperative.

9. The chip of claim 1, wherein the control circuitry is to determine the estimated level of activity and what range it is in.

10. The chip of claim 1, wherein in response to the estimated activity level being in the first range, the control circuitry sends a command to be transmitted to another chip instructing the other chip to make some of its transmitters and receivers to be inoperative.

11. The chip of claim 9, wherein the control circuitry considers incoming commands to make the estimation.

12. The chip of claim 2, wherein following the control circuitry causing some of the transmitters and receivers to be inoperative, if the estimated activity level becomes in the second range, the control circuitry causes the transmitters and receivers to be operative again.

13. A chip comprising:
    transmitters, receivers, and control circuitry; and
    wherein in response to the control circuitry receiving a first type of command indicative of an estimated activity level corresponding to an estimated number of signals expected to pass through a link coupled to the chip in an amount of time, the control circuitry is to cause some of the transmitters and receivers to be inoperative, while others of the transmitters and receivers remain operative.

14. The chip of claim 13, wherein in response to the control circuitry receiving a second type of command, the control circuitry causes the transmitters and receivers to be operative again.

15. The chip of claim 13, wherein in response to the control circuitry receiving a third type of command, the control circuitry causes some of the receivers to be inoperative while the other receivers and all the transmitters remain operative.

16. The chip of claim 13, further comprising gating circuitry coupled to a conductor to carry a voltage signal and wherein the control circuitry controls whether at least a portion of the transmitters and receivers receive the voltage signal through the gating circuitry, and at least some of the transmitters and receivers that do not receive the voltage signal are inoperative.

17. The chip of claim 13, wherein the first and second transmitters at times provide read data signals from a memory core.

18. The chip of claim 16, wherein the gating circuitry is coupled to additional conductors carrying the voltage signal and other signals.

19. A system comprising:
a first chip including control circuitry and transmitters and receivers coupled through lanes to receivers and transmitters of a second chip, wherein the first chip includes a memory controller and a processor and the second chip is a memory device; and
wherein in response to an estimated activity level being in a first range, the control circuitry of the first chip is to cause a command to be sent to the second chip and cause some of the transmitters and receivers of the first chip to be inoperative, and wherein in response to receiving the command, control circuitry of the second chip is to cause some of the transmitters and receivers of the second chip to be inoperative.

20. The system of claim 19, if following the estimated activity level being in a first range, the estimated activity level becomes in a second range, the control circuitry of the first chip causes another command to be sent to the second chip and causes the inoperative transmitters and receivers of the first chip to be operative, and wherein in response to receiving the other command, the control circuitry of the second chip causes the inoperative transmitters and receivers to be operative.

21. The system of claim 19, wherein the second chip is a buffer coupled to memory devices each having a memory core.

22. The system of claim 19, wherein in response to the estimated activity level being in a second range, the control circuitry of the first chip does not cause any of the transmitters and receivers of the first chip to be inoperative and does not cause the command to be sent to the second chip.

23. The system of claim 19, wherein if the estimated activity level is in a third range, the control circuitry of the first chip causes additional ones of the transmitters and receivers of the first chip to be inoperative.

24. The system of claim 19, wherein the first chip further comprises gating circuitry coupled to a conductor to carry a voltage signal and wherein the control circuitry of the first chip controls whether at least a portion of the transmitters and receivers of the first chip receive the voltage signal through the gating circuitry, and wherein at least some of the transmitters and receivers of the first chip that do not receive the voltage signal are inoperative.

25. The system of claim 19 wherein the second chip further comprises gating circuitry coupled to a conductor to carry a voltage signal and wherein the control circuitry of the second chip controls whether at least a portion of the transmitters and receivers of the second chip receive the voltage signal through the gating circuitry, and wherein at least some of the transmitters and receivers of the second chip that do not receive the voltage signal are inoperative.

26. The system of claim 19, wherein the control circuitry of the first chip is to determine the estimated level of activity and what type it is.

27. The system of claim 19, wherein the second chip is one of several memory devices coupled through groups of the lanes to the first chip, and the control circuitry is to cause all of some groups of lanes to be inoperative while all of others groups of lanes are to be operative.

28. The system of claim 19, wherein the second chip is one of several memory devices coupled through groups of the lanes to the first chip, and the control circuitry is to make some of the lanes of each of the groups inoperative.

29. The system of claim 19, wherein the estimated activity level corresponds to an estimated number of signals expected to pass through the lanes in an amount of time.

* * * * *